US012779882B2

(12) United States Patent
Nakao

(10) Patent No.: US 12,779,882 B2
(45) Date of Patent: Nov. 3, 2026

(54) IMAGE FORMING APPARATUS

(71) Applicant: KYOCERA Document Solutions Inc., Osaka (JP)

(72) Inventor: Shunsuke Nakao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 84 days.

(21) Appl. No.: 19/090,657

(22) Filed: Mar. 26, 2025

(65) Prior Publication Data

US 2025/0313019 A1 Oct. 9, 2025

(30) Foreign Application Priority Data

Apr. 5, 2024 (JP) ................................ 2024-061277

(51) Int. Cl.
*B41J 11/00* (2006.01)
*B41J 13/00* (2006.01)

(52) U.S. Cl.
CPC ...... *B41J 11/00222* (2021.01); *B41J 11/0095* (2013.01); *B41J 13/0036* (2013.01)

(58) Field of Classification Search
CPC ............................... B41J 11/0095; B41J 13/00
See application file for complete search history.

(56) References Cited

U.S. PATENT DOCUMENTS

2012/0038724 A1* 2/2012 Sanada .................... B41J 29/38 347/102
2015/0273870 A1* 10/2015 Hara .................. B41J 11/00216 347/16
2020/0269608 A1* 8/2020 Yoda .................... B41J 11/0024

FOREIGN PATENT DOCUMENTS

JP 2022-121194 A 8/2022

* cited by examiner

*Primary Examiner* — Scott A Richmond
(74) *Attorney, Agent, or Firm* — Stein IP, LLC

(57) ABSTRACT

An image forming apparatus includes an image forming unit, a conveying unit, a drying unit, a first detection unit, and a control unit. The image forming unit forms an image on a paper sheet. The conveying unit conveys the paper sheet from an upstream side to a downstream side of the image forming unit. The drying unit includes a heater so as to heat and dry the paper sheet on which the image is formed. The first detection unit detects carry-in of the paper sheet from the conveying unit to the drying unit. The control unit controls the drying unit. If the first detection unit detects that the paper sheet is carried into the drying unit earlier than a determination threshold value, the control unit suppresses heating by the drying unit.

6 Claims, 4 Drawing Sheets

IMAGE FORMING APPARATUS

INCORPORATION BY REFERENCE

This application is based upon and claims the benefit of priority from the corresponding Japanese Patent Application No. 2024-061277 filed Apr. 5, 2024, the entire contents of which are hereby incorporated by reference.

BACKGROUND

The present disclosure relates to an image forming apparatus.

In a conventional image forming system, ink is ejected to a sheet, and after that the sheet is heated, in order to dry the ink ejected to the sheet.

SUMMARY

An image forming apparatus according to the present disclosure includes an image forming unit, a conveying unit, a drying unit, a first detection unit, and a control unit. The image forming unit forms an image on a recording medium. The conveying unit conveys the recording medium from an upstream side to a downstream side of the image forming unit. The drying unit includes a heater, so as to heat and dry the recording medium on which the image is formed. The first detection unit detects carry-in of the recording medium from the conveying unit to the drying unit. The control unit controls the drying unit. If the first detection unit detects that the recording medium is carried into the drying unit earlier than a determination threshold value, the control unit suppresses heating by the drying unit.

Other features of the present disclosure and specific advantages obtained by the present disclosure will become more apparent from the description of the embodiment given below.

DETAILED DESCRIPTION

Figure 1:
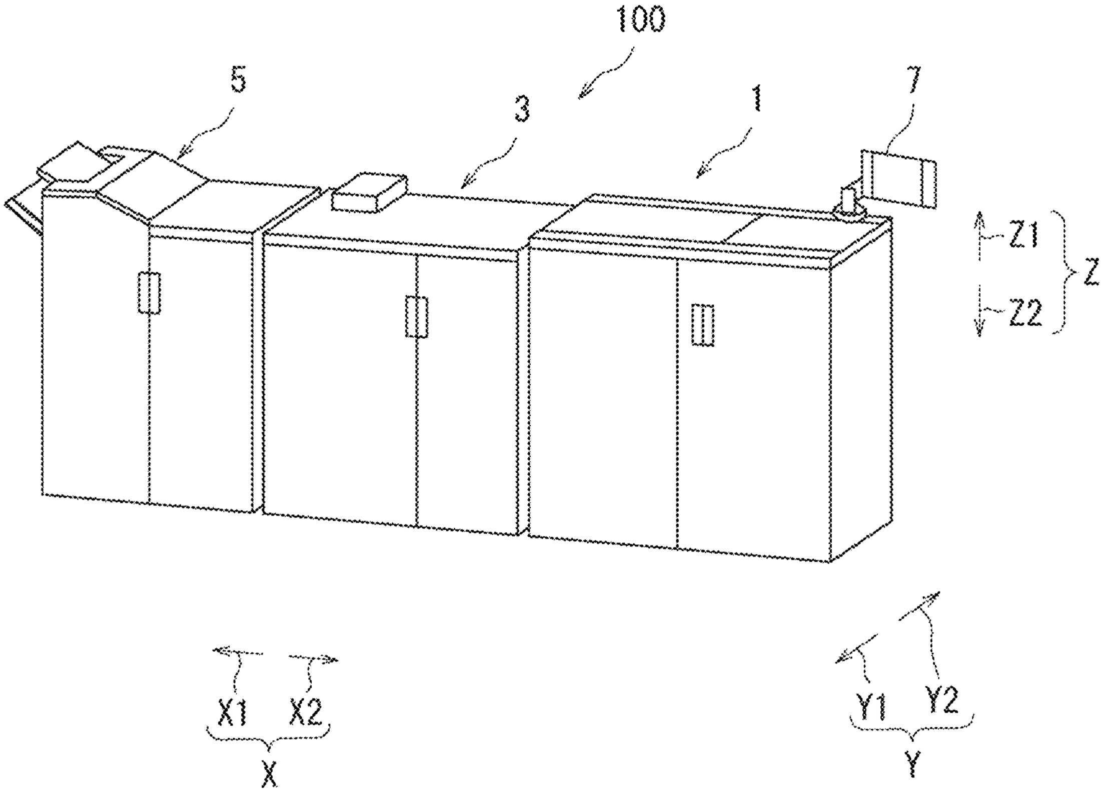
FIG. 1 is a perspective view illustrating an external view of an image forming apparatus according to an embodiment of the present disclosure.

Hereinafter, an embodiment of the present disclosure is described, but before that, a problem of a conventional technique is described.

For instance, there is a conventional image forming system as below. The image forming system includes a printer and a drying device. The drying device includes a conveying device having an endless belt that conveys a sheet that has been conveyed, and a first drying unit having a heat source that radiates infrared rays to a part of a conveyance section. In this image forming system, after the sheet is detected at a region facing the heat source, an excessive heating is determined.

However, in the conventional image forming system described above, the process is started after the sheet arrives at the heat source, and hence the heating by the heat source cannot be suppressed until the sheet arrives at the heat source.

In view of the above problem, it is an object of the present disclosure to provide an image forming apparatus that can suppress heating by the heat source before the sheet arrives at the heat source.

An embodiment of the present disclosure is described with reference to the drawings. Note that in the following description, the same or corresponding parts are denoted by the same reference numeral or symbol, and are referred to the common description.

Figure 2:
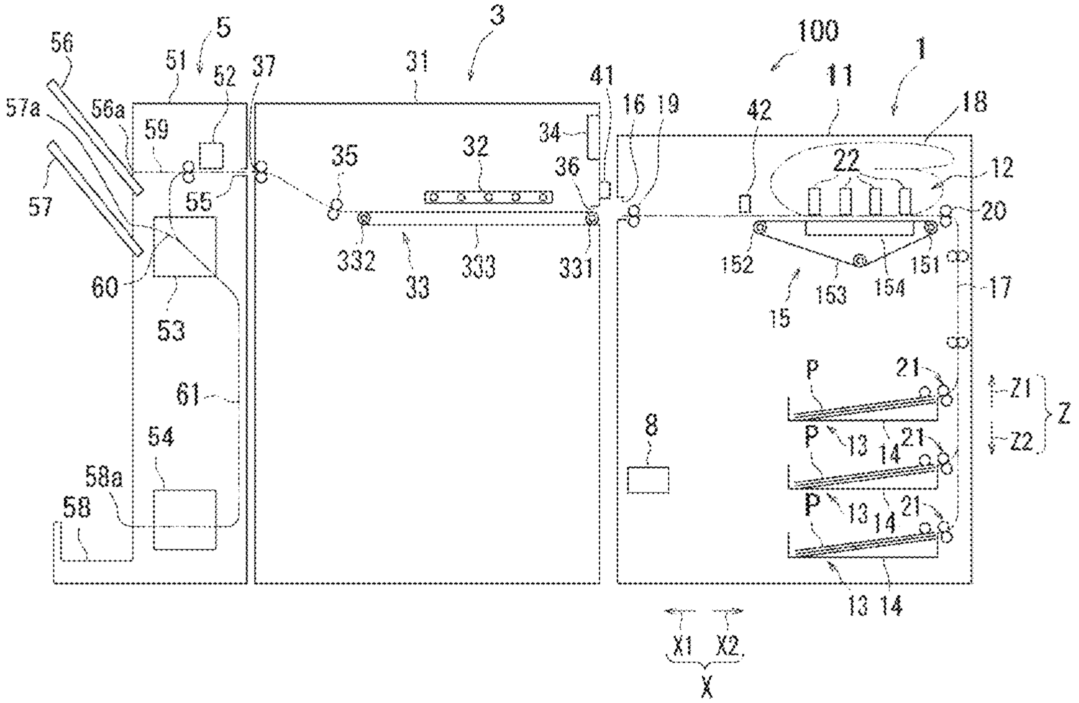
FIG. 2 is a diagram illustrating an example of a structure of the image forming apparatus.

With reference to FIGS. 1 and 2, a structure of an image forming apparatus 100 is described. FIG. 1 is a perspective view illustrating an external view of the image forming apparatus 100 according to the embodiment of the present disclosure. FIG. 2 is a diagram illustrating an example of a structure of the image forming apparatus 100.

The image forming apparatus 100 is an inkjet recording apparatus such as a monochrome printer, a color printer, or the like that can perform duplex printing, which forms an image on a printing paper sheet (hereinafter, may be referred to as a paper sheet) P, using aqueous ink. In addition, the paper sheet P may be any type such as plain paper, copying paper, recycled paper, thin paper, thick paper, or glossy paper.

As illustrated in FIGS. 1 and 2, the image forming apparatus 100 includes a main body part 1, a drying unit 3, a post-processing unit 5, an operation unit 7, a control unit 8, and a first detection unit 41. The main body part 1 forms an image on the paper sheet P. The drying unit 3 dries the paper sheet P on which the image is formed, while relaying the paper sheet P from the main body part 1 to the post-processing unit 5. The post-processing unit 5 performs a post-processing on the paper sheet P on which the image is formed, and discharges the paper sheet P. The paper sheet P corresponds to a "recording medium", for example.

In this embodiment, in the image forming apparatus 100, a conveying direction from the main body part 1 to the post-processing unit 5 is defined as a front side X1, and its opposite direction is defined as a rear side X2. A left side of the image forming apparatus 100 viewed from the rear side X2 is defined as a left side Y1, and its opposite direction is defined as a right side Y2. In addition, in an up and down direction Z perpendicular to a front and rear direction X as well as a left and right direction Y of the image forming apparatus 100, a side on which the operation unit 7 is disposed with respect to the main body part 1 is defined as an upper side Z1, and its opposite direction is defined as a lower side Z2. Note that, these orientations do not limit orientations when using the image forming apparatus 100 of the present disclosure.

First, a structure of the main body part 1 is described. As illustrated in FIG. 2, the main body part 1 includes an enclosure 11, an image forming unit 12, a paper feed unit 13, a conveying unit 15, a conveying path 17, and a send-out unit 19.

The enclosure 11 houses the image forming unit 12, the paper feed unit 13, and the like. The enclosure 11 is provided with a carry-out port 16. The carry-out port 16 is positioned at an upper part of a side face on the front side X1 of the enclosure 11. The paper sheet P is carried out through the carry-out port 16 to the drying unit 3.

The paper feed unit 13 supplies the paper sheet P to the conveying path 17. For instance, a plurality of the paper feed units 13 are disposed. The plurality of paper feed units 13 are arranged in an up and down direction Z in a lower part of the enclosure 11. Each of the paper feed units 13 includes a paper sheet cassette 14 and a feeding device 21.

The paper sheet cassette 14 houses the paper sheets P. The feeding device 21 feeds the paper sheet P from the paper sheet cassette 14 to the conveying path 17.

The conveying path 17 is a conveying passage for conveying the paper sheet P. The conveying path 17 runs from the feeding device 21 of the paper feed unit 13 through the image forming unit 12 to the carry-out port 16. The conveying path 17 includes a reverse conveying path 18, the send-out unit 19, and a registration roller pair 20.

The reverse conveying path 18 is used for reversing front and back sides of the paper sheet P. The reverse conveying path 18 branches from the conveying path 17 on the downstream side of the image forming unit 12 in the conveying direction of the paper sheet P. The reverse conveying path 18 joins the conveying path 17 on the upstream side of the image forming unit 12. The send-out unit 19 is disposed in a vicinity of the carry-out port 16.

The registration roller pair 20 is disposed in the conveying path 17 on the upstream side of the image forming unit 12 in the conveying direction. The registration roller pair 20 corrects a skew of the paper sheet P with respect to the image forming unit 12 when the paper sheet P abuts and stops at the registration roller pair 20. Then, the registration roller pair 20 allows the paper sheet P to temporarily wait for synchronization between image formation timing and conveying timing of the paper sheet P, and after that, sends out the paper sheet P to the image forming unit 12 in synchronization with the image formation timing.

The image forming unit 12 forms an image on the paper sheet P. Specifically, the image forming unit 12 ejects ink to the paper sheet P so as to form an image. The image forming unit 12 is disposed above the paper feed unit 13. The image forming unit 12 includes four recording heads 22.

The four recording heads 22 uses toners of a plurality of colors so as to form an image on the paper sheet P. Specifically, the four recording heads 22 include the recording head 22 that ejects yellow ink, the recording head 22 that ejects cyan ink, the recording head 22 that ejects magenta ink, and the recording head 22 that ejects black ink. The recording head 22 that ejects yellow ink is communicated to an ink tank for yellow ink (not shown) via a feed pump for yellow ink (not shown). The recording head 22 that ejects cyan ink is communicated to an ink tank for cyan ink (not shown) via a feed pump for cyan ink (not shown). The recording head 22 that ejects magenta ink is communicated to an ink tank for magenta ink (not shown) via a feed pump for magenta ink (not shown). The recording head 22 that ejects black ink is communicated to an ink tank for black ink (not shown) via a feed pump for black ink (not shown).

The conveying unit 15 conveys the paper sheet P from the upstream side to the downstream side of the image forming unit 12. The conveying unit 15 conveys the paper sheet P along a direction where the four recording heads 22 are arranged. The conveying unit 15 includes, for example, a drive roller 151, a motor (not shown) that drives the drive roller 151, a driven roller 152, and an endless belt 153 that is stretched around the drive roller 151 and the driven roller 152. Note that, in this embodiment, the conveying unit 15 is provided with a suction mechanism 154 that sucks the paper sheet P.

Next, an operation of the main body part 1 is described. First, in the paper feed unit 13, the feeding device 21 sends out the paper sheet P from the paper sheet cassette 14 to the conveying path 17. The sent-out paper sheet P is conveyed along the conveying path 17, and is sucked on the upper surface of the endless belt 153 in the image forming unit 12. Further, the paper sheet P is conveyed along with rotation of the conveying unit 15, while an image is formed on the paper sheet P with inks ejected from the recording heads 22.

The paper sheet P on which the image is formed is conveyed by the conveying unit 15 to the front side X1, and after that, it is sandwiched by the send-out unit 19. The send-out unit 19 includes a pair of rollers arranged in the up and down direction Z. The rotation drive timing of the send-out unit 19 is adjusted. The send-out unit 19 discharges the paper sheet P through the carry-out port 16 at a predetermined timing. The paper sheet P is discharged through the carry-out port 16 in a state where the side on which the image is formed faces up.

When duplex printing is performed, the paper sheet P after an image is formed on one side is conveyed to the reverse conveying path 18, and front and back sides thereof are reversed. The paper sheet P whose front and back sides are reversed is conveyed to the conveying path 17 and sucked on the upper surface of the endless belt 153. Then, the paper sheet P is conveyed along with rotation of the endless belt 153 while an image is formed on the other side. The paper sheet P is discharged through the carry-out port 16 in a state where the last printed side faces up.

Next, a structure of the drying unit 3 is described. The drying unit 3 is disposed separately from the main body part 1 as well as the post-processing unit 5, and is connected to each of the main body part 1 and the post-processing unit 5. The drying unit 3 dries the paper sheet P while relaying the paper sheet P from the main body part 1 to the post-processing unit 5.

The drying unit 3 heats and dries the paper sheet P on which the image is formed. As illustrated in FIG. 2, the drying unit 3 includes an enclosure 31, a heater 32, a dry conveying unit 33, a fan 34, a conveying roller pair 35, a receiving port 36, a delivery port 37, and the first detection unit 41.

The enclosure 31 of the drying unit 3 has an outer periphery covered with a cover that keeps heat inside, for example. Among side faces of the enclosure 31, the side face on the rear side X2 is provided with the receiving port 36 for the paper sheet P sent out from the main body part 1. The receiving port 36 is formed at the same height as the carry-out port 16 of the main body part 1. Among side faces of the enclosure 31, the side face on the front side X1 is provided with the delivery port 37 for the paper sheet P. The delivery port 37 is formed at the same height as a carry-in port 55 of the post-processing unit 5.

The dry conveying unit 33 conveys the paper sheet P from the upstream side to the downstream side of the drying unit 3. The dry conveying unit 33 conveys the paper sheet P under the heater 32, in the direction to the front side X1, i.e., from the receiving port 36 to the delivery port 37. The dry conveying unit 33 includes, for example, a drive roller 331, a motor (not shown) that drives the drive roller 331, a driven roller 332, and an endless belt 333 stretched around the drive roller 331 and the driven roller 332.

The heater 32 heats the paper sheet P on which the image is formed. The heater 32 is disposed on the upper side Z1 of the dry conveying unit 33. The heater 32 dries the paper sheet P placed on the endless belt 333. The heater 32 includes, for example, a ceramic heater (not shown), a fin (not shown), and a fan (not shown). In the heater 32, the fin is disposed around the ceramic heater, and the fan is disposed at an upstream side position of the ceramic heater. The air warmed by the heater 32 is stored in the enclosure 31. Note that the fan of the heater 32 is different from the fan 34.

The fan 34 discharges the air stored in the enclosure 31 to the outside.

The conveying roller pair 35 conveys the paper sheet P dried by the heater 32 to the front side X1, i.e., from the dry conveying unit 33 to the delivery port 37. The conveying roller pair 35 is disposed in the conveying path of the paper sheet P.

The first detection unit 41 detects the paper sheet P. The first detection unit 41 detects carry-in of the paper sheet P from the conveying unit 15 to the drying unit 3. The first detection unit 41 is disposed at an upstream side position of the heater 32 in the conveying direction, for example. Specifically, the first detection unit 41 is disposed at a position near the receiving port 36. The first detection unit 41 is, for example, a photoelectronic sensor that detects that the paper sheet P exists. Note that, the first detection unit 41 is not limited to a photoelectronic sensor. The first detection unit 41 may be a proximity sensor or a contact sensor.

Next, a structure of the post-processing unit 5 is described. The post-processing unit 5 performs post-processing on the paper sheet P and then discharges the same to the outside of the image forming apparatus 100. The post-processing unit 5 includes an enclosure 51, a punching device 52, a stapler device 53, and a center folding device 54.

The enclosure 51 is provided with the carry-in port 55, a first tray 56, a second tray 57, and a third tray 58.

The carry-in port 55 receives the paper sheet P from the drying unit 3. The carry-in port 55 is formed on the side face of the enclosure 51 on the rear side X2.

The first tray 56, the second tray 57, and the third tray 58 are disposed on the side face of the enclosure 51 on the front side X1. The side face of the enclosure 51 on the front side X1 is provided with a first discharge port 56*a*, a second discharge port 57*a*, and a third discharge port 58*a*. The first tray 56 is disposed below the first discharge port 56*a*. The second tray 57 is disposed below the second discharge port 57*a*. The third tray 58 is disposed below the third discharge port 58*a*.

The punching device 52 is disposed in an upper part of the enclosure 51, the stapler device 53 is disposed below the punching device 52, and the center folding device 54 is disposed in a lower part of the enclosure 51. The first discharge port 56*a* is disposed on the front side X1 of the punching device 52. The second discharge port 57*a* is disposed on the front side X1 of the stapler device 53. The third discharge port 58*a* is disposed on the front side X1 of the center folding device 54.

The enclosure 51 houses a first conveying path 59, a second conveying path 60, and a third conveying path 61. The first conveying path 59 runs from the carry-in port 55 through the punching device 52 to the first discharge port 56*a*. The second conveying path 60 branches from the first conveying path 59 on the downstream side of the punching device 52 and runs through the stapler device 53 to the second discharge port 57*a*. The third conveying path 61 branches from the second conveying path 60 and runs through the center folding device 54 to the third discharge port 58*a*.

Figure 3:
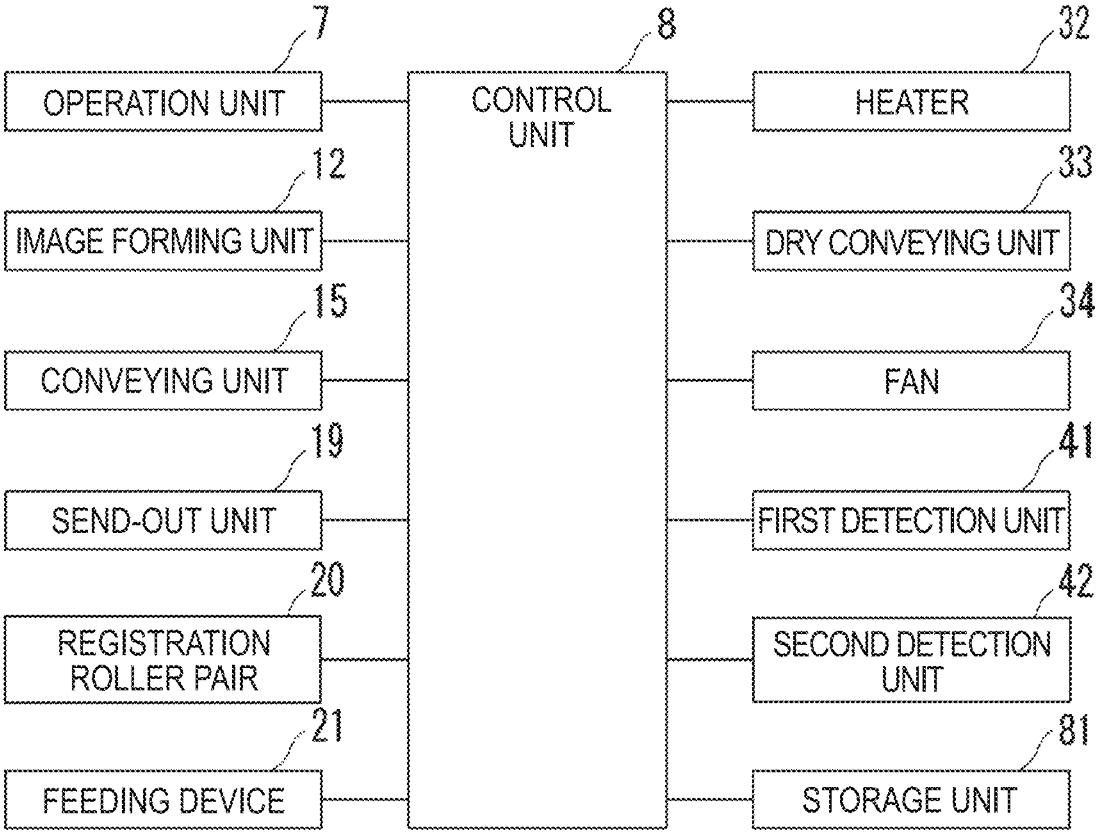
FIG. 3 is a block diagram illustrating an example of a structure of a control unit.

Next, with reference to FIGS. 2 and 3, the control unit 8 is described. FIG. 3 is a block diagram illustrating an example of a structure of the control unit 8.

The control unit 8 is constituted of a processor such as a central processing unit (CPU), a nonvolatile memory (read only memory (ROM)), and a volatile memory (random access memory (RAM)). In addition, the control unit 8 includes an integrated circuit for image forming processing. The integrated circuit for image forming processing is constituted of an application specific integrated circuit (ASIC), for example. The ROM stores a control program in advance, for allowing the CPU to execute various types of arithmetic processing. The control program may be stored not in a storage unit 81 but in the ROM. The RAM temporarily stores the various types of arithmetic processing executed by the CPU. The control unit 8 executes the control program (the control program stored in advance in the storage unit 81 or the ROM), so as to control operations of the image forming apparatus 100.

The control unit 8 controls image formation on the paper sheet P. Specifically, the control unit 8 controls at least the drying unit 3 and the image forming unit 12. In addition, when the image formation on the paper sheet P is requested, the control unit 8 preferably initializes various types of parameters to be used for controlling the image formation on the paper sheet P. The image formation on the paper sheet P may be requested by a user who operates the operation unit 7. It may be possible that the image formation on the paper sheet P is requested by a user who operates an external device (such as a personal computer).

As illustrated in FIG. 3, the control unit 8 is connected to the operation unit 7, the image forming unit 12, the conveying unit 15, the send-out unit 19, the registration roller pair 20, the feeding device 21, the heater 32, the dry conveying unit 33, the fan 34, the first detection unit 41, a second detection unit 42, and the storage unit 81, in a communicable manner via an interface (not shown).

The storage unit 81 is constituted of a nonvolatile memory. For instance, the storage unit 81 is preferably a hard disk drive. The storage unit 81 preferably stores image data for printing, the control program related to various types of control, and data to be used in the control program, for example. As the control program, there are, for example, a program for controlling the image formation on the paper sheet P (hereinafter, may be referred to as a "first control program"), and a program for suppressing excessive heating of the paper sheet P by the heater 32 (hereinafter, may be referred to as a "second control program").

The first control program means a program for performing the image formation on the paper sheet P. As the data to be used by the processor when the first control program is executed, there is an amount of ejection of the aqueous ink to a printing area, for example.

The second control program means a program for controlling the heater 32 and the fan 34. As the data to be used in the second control program, there are, for example, detection timing of the paper sheet P by the first detection unit 41, timing when an image is formed first time on the paper sheet P after the image formation is started, and a determination threshold value K.

The control unit 8 suppresses heating by the drying unit 3. Specifically, when the first detection unit 41 detects that the paper sheet P is carried into the drying unit 3 earlier than the determination threshold value K, the control unit 8 suppresses heating by the drying unit 3. In this way, before the paper sheet P reaches the heater 32, heating by the heater 32 can be suppressed. Specifically, just after the image forming apparatus 100 starts its operation, if the remaining paper sheet P is not detected by the sensor, the dry conveying unit 33 is not operated. Therefore, the paper sheet P sent out from the main body part 1 may interfere with the dry conveying unit 33. If the paper sheet P interferes with the dry conveying unit 33, the paper sheet P may be wrinkled. The wrinkled paper sheet P may cause jamming in a vicinity of the heater 32. Therefore, generation of a wrinkle is predicted when the paper sheet P is carried into the drying unit 3. If it is predicted that a wrinkle will be generated, heating by the heater 32 is suppressed in advance.

With reference to FIGS. 2 and 3, the image forming apparatus 100 is further described. The image forming apparatus 100 further includes the second detection unit 42.

As illustrated in FIGS. 2 and 3, the second detection unit 42 detects the paper sheet P. The second detection unit 42 is disposed between the image forming unit 12 above the conveying unit 15 and the drying unit 3. Specifically, the second detection unit 42 is disposed on the most downstream of the conveying unit 15. In other words, it is disposed between the downstream of the image forming unit 12 and the send-out unit 19. The second detection unit 42 detects the paper sheet P on which the image is formed. The second detection unit 42 is, for example, a photoelectronic sensor that detects that the paper sheet P exists. In this embodiment, one or more paper sheets P can stay in the conveying path 17 between the second detection unit 42 and the send-out unit 19. In addition, there is no sensor that detects the paper sheet P in the conveying path 17 between the second detection unit 42 and the send-out unit 19. Therefore, there is formed a section in which the paper sheet P remains in the conveying path 17 between the second detection unit 42 and the send-out unit 19.

An upstream end portion of the dry conveying unit 33 is close to the receiving port 36. In other words, the first detection unit 41 is disposed near the entrance of the dry conveying unit 33. In this way, the first detection unit 41 can detect the paper sheet P before it is carried into the dry conveying unit 33. The control unit 8 can suppress heating by the drying unit 3 before the paper sheet P is carried into the dry conveying unit 33.

After the image formation is started, when the second detection unit 42 detects the paper sheet P, the control unit 8 starts conveying by the dry conveying unit 33. Specifically, when the second detection unit 42 detects the paper sheet P, the control unit 8 starts to drive the drive roller 331. In this way, the dry conveying unit 33 can convey the paper sheet P on which the image is formed to the area facing the heater 32 while suppressing the heating operation. When a start button (not shown) is operated to start the image forming apparatus 100, the control unit 8 controls the image forming unit 12, the conveying unit 15, the send-out unit 19, the registration roller pair 20, the feeding device 21, and the heater 32 to start their operations. After the image formation starts, when any one of a plurality of paper sheet sensors (not shown) and the second detection unit 42 disposed in the main body part 1 detects the paper sheet P, the dry conveying unit 33 starts the conveying operation.

The control unit 8 sets the determination threshold value K. The determination threshold value K is set on the basis of a time period after the image formation is started until the paper sheet P on which the image is formed first time reaches the first detection unit 41. In this way, it is possible to determine whether or not the paper sheet P detected by the first detection unit 41 is the paper sheet P that was remaining in the conveying path 17 of the main body part 1. Specifically, a time point when an image is formed first time means a time point when the registration roller pair 20 conveys the paper sheet P to the image forming unit 12. Further, the paper sheet P needs a convey time corresponding to the determination threshold value K after the time point when an image is formed first time until reaching the first detection unit 41. In other words, after the image formation is started, if the first detection unit 41 detects the paper sheet P before a time corresponding to the determination threshold value K elapses, the detected paper sheet P is determined to be the paper sheet P that was remaining in the conveying path 17 (e.g., in the section between the second detection unit 42 and the send-out unit 19) in the main body part 1. In this embodiment, the time period until the paper sheet P on which the image is formed reaches the first detection unit 41 is set as the determination threshold value K.

The control unit 8 includes a counter (not shown). The control unit 8 measures the time period after the image formation is started until the paper sheet P on which the image is formed first time reaches the first detection unit 41, for a plurality of times. The control unit 8 measures every time when the image forming apparatus 100 starts to operate. The control unit 8 sets the determination threshold value K on the basis of the plurality of measured time periods. In this way, the determination threshold value K can be set with high accuracy. For instance, the control unit 8 stores the measured time periods for each type of the paper sheet P (such as basis weight), and updates the determination threshold value K on the basis of the measured time periods. By regularly updating the determination threshold value K, the determination threshold value K can be obtained corresponding to operating environment (such as temperature and humidity), in addition to the type of the paper sheet P.

Figure 4:
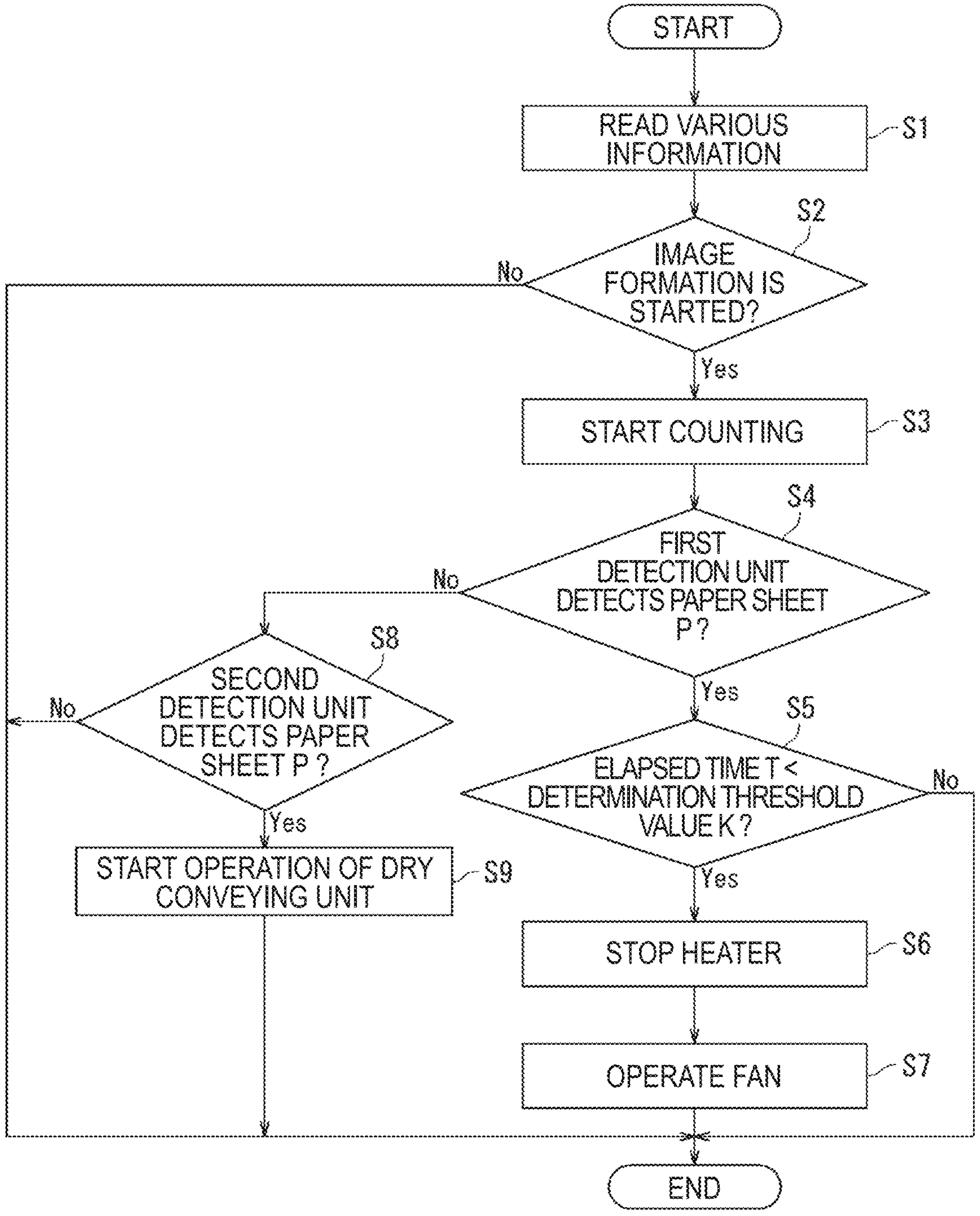
FIG. 4 is a flowchart illustrating an example of heat suppression control.

Next, with reference to a flowchart of FIG. 4, the process performed by the control unit 8 is described. FIG. 4 is a flowchart illustrating an example of heat suppression control. As illustrated in FIG. 4, the program stored in a storage device of the storage unit 81 (see FIG. 3) allows the processor of the control unit 8 to perform the process of Steps S1 to S9.

As illustrated in FIG. 4, in Step S1, the control unit 8 reads various types of information such as detected signals and the determination threshold value K corresponding to the type of the paper sheet P. The process proceeds to Step S2.

In Step S2, the control unit 8 determines whether or not, with the start button operated to start the image forming apparatus 100, image formation is started by the image forming apparatus 100. If the control unit 8 determines that image formation is not started (No in Step S2), the process is finished. If the control unit 8 determines that image formation is started (Yes in Step S2), the process proceeds to Step S3.

In Step S3, the control unit 8 starts counting by the counter, so as to measure an elapsed time T after an image is formed on the first paper sheet P. The process proceeds to Step S4.

In Step S4, the control unit 8 determines whether or not the first detection unit 41 has detected the paper sheet P. If the control unit 8 determines that the first detection unit 41 has not detected the paper sheet P (No in Step S4), the process proceeds to Step S8. If the control unit 8 determines that the first detection unit 41 has detected the paper sheet P (Yes in Step S4), the process proceeds to Step S5.

In Step S5, the control unit 8 determines whether or not the elapsed time T is less than the determination threshold value K. If the control unit 8 determines that the elapsed time T is the determination threshold value K or more (No in Step S5), the process is finished. If the elapsed time T is the determination threshold value K or more, it is determined that the paper sheet P on which the image is formed first time is detected after the image forming apparatus 100 is started. If the control unit 8 determines that the elapsed time T is less than the determination threshold value K (Yes in Step S5), the process proceeds to Step S6. It is determined that the paper sheet P that was remaining between the second detection unit 42 and the send-out unit 19 is detected. In other words, the dry conveying unit 33 is not driven, and the sent-out paper sheet P may interfere with the dry conveying unit 33 so that the paper sheet P may be wrinkled.

In Step S6, the control unit 8 stops heating by the heater 32. The process proceeds to Step S7. In this way, temperature increase inside the drying unit 3 is stopped.

In Step S7, the control unit 8 starts operation of the fan 34. When the fan 34 operates, heated air inside the enclosure 31 is discharged to the outside. In this way, the process is finished.

In the case of No in Step S4, the control unit 8 determines in Step S8 whether or not the second detection unit 42 has detected the paper sheet P. If the control unit 8 determines that the second detection unit 42 has not detected the paper sheet P (No in Step S8), the process is finished. If the control unit 8 determines that the second detection unit 42 has detected the paper sheet P (Yes in Step S8), the process proceeds to Step S9.

In Step S9, the control unit 8 starts operation of the dry conveying unit 33. The process is finished.

The embodiment of the present disclosure is described above with reference to the drawings. However, the present disclosure is not limited to the above embodiment, but can be implemented in various forms without deviating from the spirit thereof. In addition, by appropriately combining a plurality of structural elements disclosed in the above embodiment, various disclosures can be formed. For instance, some structural elements may be eliminated from the entire structural elements disclosed in the embodiment. The drawings schematically illustrates main structural elements for easy understanding, and the number or the like of the illustrated structural elements may be different from that in reality, for convenience sake of drawing. In addition, each structural element illustrated in the above embodiment is merely an example, which is not particularly limited, and can be variously modified within the scope without substantially deviating from the effect of the present disclosure.

(1) As described above with reference to FIGS. 1 to 4, the above embodiment shows the example in which heating by the heater 32 is stopped if the paper sheet P is carried into the drying unit 3 earlier than the determination threshold value K, but this is not a limitation. It may be possible to decrease a level (temperature) of heating by the heater 32. In this case, it is preferred to decrease the level of heating more as jamming of the paper sheet P can occur more easily. For instance, it may be possible to decrease the level of heating of the heater 32 more as the conveying speed of the conveying unit 15 is slower.

(2) As described above with reference to FIGS. 1 to 4, the above embodiment shows the example in which the time period until the paper sheet P on which the image is formed reaches the first detection unit 41 is set as the determination threshold value K, but this is not a limitation. It may be possible to modify the time period until the paper sheet P on which the image is formed reaches the first detection unit 41, and to set the modified value as the determination threshold value K. In this case, the determination threshold value K is set to be smaller as jamming of the paper sheet P occurs more easily, while it is set to be larger as jamming of the paper sheet P occurs more hardly.

According to the image forming apparatus of the present disclosure, heating by the heat source can be suppressed before the sheet reaches the heat source.

The present disclosure can be used in the field of the image forming apparatus.

What is claimed is:

1. An image forming apparatus comprising:

an image forming unit configured to form an image on a recording medium;

a conveying unit configured to convey the recording medium from an upstream side to a downstream side of the image forming unit;

a drying unit including a heater, so as to heat and dry the recording medium on which the image is formed;

a first detection unit configured to detect carry-in of the recording medium from the conveying unit to the drying unit; and a control unit configured to control the drying unit, wherein if the first detection unit detects that the recording medium is carried into the drying unit earlier than a determination threshold value, the control unit suppresses heating by the drying unit.

2. The image forming apparatus according to claim 1, wherein the first detection unit is disposed at a position near an entrance of the drying unit.

3. The image forming apparatus according to claim 1, wherein the determination threshold value is set on the basis of a time period after the image formation is started until the recording medium on which the image is formed first time reaches the first detection unit.

4. The image forming apparatus according to claim 3, wherein the control unit measures the time period after the image formation is started until the recording medium on which the image is formed first time reaches the first detection unit, for a plurality of times, and the control unit sets the determination threshold value on the basis of the plurality of measured time periods.

5. The image forming apparatus according to claim 1, further comprising a second detection unit configured to detect the recording medium at a position between the image forming unit and the drying unit of the conveying unit, wherein the drying unit includes a dry conveying unit, and when the second detection unit detects the recording medium after the image formation is started, the control unit starts conveying by the dry conveying unit.

6. The image forming apparatus according to claim 1, wherein the image forming unit ejects ink to the recording medium so as to form the image.

* * * * *